UNITED STATES PATENT OFFICE.

MAX ENGELMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

PROCESS OF MAKING DIALKYLBARBITURIC ACID.

No. 879,156.     Specification of Letters Patent.     Patented Feb. 18, 1908.

Application filed July 20, 1906. Serial No. 327,084.

*To all whom it may concern:*

Be it known that I, MAX ENGELMANN, doctor of philosophy, chemist, citizen of the German Empire, residing at Elberfeld, Germany, Kingdom of Prussia, have invented new and useful Improvements in Processes of Making Dialkylbarbituric Acids, of which the following is a specification.

My invention relates to a new process for the manufacture and production of dialkyl barbituric acids 2.4.6-trioxy-5-dialkylpyrimidines) being, as is known, valuable soporifics. The new process consists in heating the dialkyl malonyl diurethanes, having the formula:

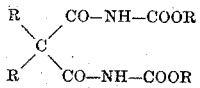

(R meaning alkyl radicles).

The yield of dialkyl barbituric acids can be increased by adding to the reaction mass carbonic acid derivatives, such as urea, diphenyl carbonate, or the like. As far as I could hitherto ascertain, these substances increase the yield without, however, entering into the reaction. The use of these carbonic acid derivatives has been specifically described and claimed in my divisional application, Serial No. 384,079, filed July 16, 1907.

By heating the dialkyl malonyl diurethanes by themselves dialkyl barbituric acids and dialkyl carbonates are formed probably according to the following formula:

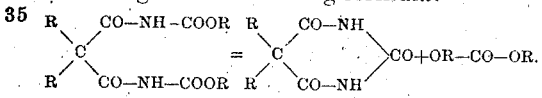

If the thus obtained melt is extracted with boiling water the dialkyl barbituric acid can be separated from the impurities. However, in order to get the pure dialkyl barbituric acid, it is advantageous to treat the melt for further purification with dilute alkaline solutions. If dilute ammonia is used then the ammoniacal liquid is filtered from unchanged diurethane, the filtrate boiled to drive off the ammonia, and allowed to cool. On cooling the dialkyl barbituric acid is precipitated.

In order to carry out my process practically I can, for instance, proceed as follows, the parts being by weight: Diethyl malonyl diurethane (obtainable by the action of diethyl malonyl dichlorid on urethane) is heated to from 200 to 210° C. for 5 hours, and the melt is dissolved in an aqueous ammonia solution. This solution is filtered and the filtrate is freed from ammonia by boiling it. The diethyl barbituric acid separates while cooling. It can be further purified by recrystallization from water. The process is carried out in an analogous manner for the production of other dialkyl barbituric acids, such as dipropyl barbituric acid, methylethyl barbituric acid, or the like.

Having now described my invention and in what manner the same is to be performed, what I claim as new and desire to secure by Letters Patent, is:

1. The process for the production of dialkyl barbituric acids, having the above given general formula, which process consists in first heating dialkyl malonyl diurethanes and isolating from the thus obtained melt the resulting 5-dialkyl-2.4.6-trioxypyrimidines, substantially as described.

2. The process for the production of dialkyl barbituric acids, which process consists in first heating dialkyl malonyl diurethanes, dissolving the thus obtained melt in ammonia, filtering the liquid, boiling the filtrate to drive off the ammonia, and crystallizing the resulting 5-dialkyl-2.4.6-trioxypyrimidines therefrom, substantially as described.

3. The process for the production of diethyl barbituric acid, having the above given general formula, which process consists in first heating diethyl malonyl diurethanes and isolating from the thus obtained melt the resulting 5-diethyl-2.4.6-trioxypyrimidine, substantially as described.

4. The process for the production of diethyl barbituric acid, which process consists in first heating diethyl malonyl diurethanes, dissolving the thus obtained melt in ammonia, filtering the liquid, boiling the filtrate to drive off the ammonia, and crystallizing the resulting 5-diethyl-2.4.6.-trioxypyrimidine therefrom, substantially as described.

In testimony whereof I have hereunto set my hand in the presence of two subscribing witnesses.

MAX ENGELMANN. [L. S.]

Witnesses:
  OTTO KÖNIG,
  J. A. RITTERSHAUS.